US006567078B2

(12) United States Patent
Ogawa

(10) Patent No.: US 6,567,078 B2
(45) Date of Patent: May 20, 2003

(54) HANDWRITING COMMUNICATION SYSTEM AND HANDWRITING INPUT DEVICE USED THEREIN

(75) Inventor: Yasuji Ogawa, Saitama (JP)

(73) Assignee: Xiroku Inc. (JP)

( * ) Notice: Subject to any disclaimer, the term of this patent is extended or adjusted under 35 U.S.C. 154(b) by 207 days.

(21) Appl. No.: 09/757,727

(22) Filed: Jan. 8, 2001

(65) Prior Publication Data

US 2001/0050669 A1 Dec. 13, 2001

(30) Foreign Application Priority Data

Jan. 25, 2000 (JP) ........................................ 2000-015150

(51) Int. Cl.[7] .............................. G09G 5/00; G06K 9/00; G06K 9/36
(52) U.S. Cl. ........................ 345/179; 345/156; 382/103; 382/291
(58) Field of Search ................................. 345/156, 173, 345/175, 179, 764, 863; 382/103, 186, 187, 188, 189, 291, 313, 314, 315; 178/18.03, 19.01, 20.01; 700/83

(56) References Cited

U.S. PATENT DOCUMENTS

| 5,168,531 A | * | 12/1992 | Sigel ........................... 382/291 |
| 5,436,639 A | * | 7/1995 | Arai et al. ................... 345/156 |
| 5,511,148 A | * | 4/1996 | Wellner ....................... 345/156 |
| 5,617,312 A | * | 4/1997 | Iura et al. ..................... 700/83 |
| 5,732,227 A | * | 3/1998 | Kuzunuki et al. ........... 345/775 |
| 6,043,805 A | * | 3/2000 | Hsieh .......................... 345/158 |
| 6,044,165 A | * | 3/2000 | Perona et al. ............... 382/103 |
| 6,160,899 A | * | 12/2000 | Lee et al. .................... 382/103 |
| 6,292,169 B1 | * | 9/2001 | Numazaki et al. .......... 345/156 |
| 6,411,732 B1 | * | 6/2002 | Saund ......................... 382/187 |

* cited by examiner

Primary Examiner—Steven Saras
Assistant Examiner—Paul Bell
(74) Attorney, Agent, or Firm—Wells St. John P.S.

(57) ABSTRACT

The present invention relates to a handwriting communication system, a handwriting input device and a handwriting display device used in the system, which can communicate by handwriting among a plurality of computers connected via a network. The communication system includes a handwriting input device which is provided at a transmitting side for inputting the handwriting into a transmitting side computer, and a handwriting display device which is provided at a receiving side for displaying the handwriting based on information transmitted from the transmitting side to a receiving side computer. The present system according to the invention transmits only a contiguous image around the handwritten portion, which reduces the communication volume compared to transmitting the whole image, and which makes the real time transmission and reception of handwriting trace possible.

21 Claims, 8 Drawing Sheets

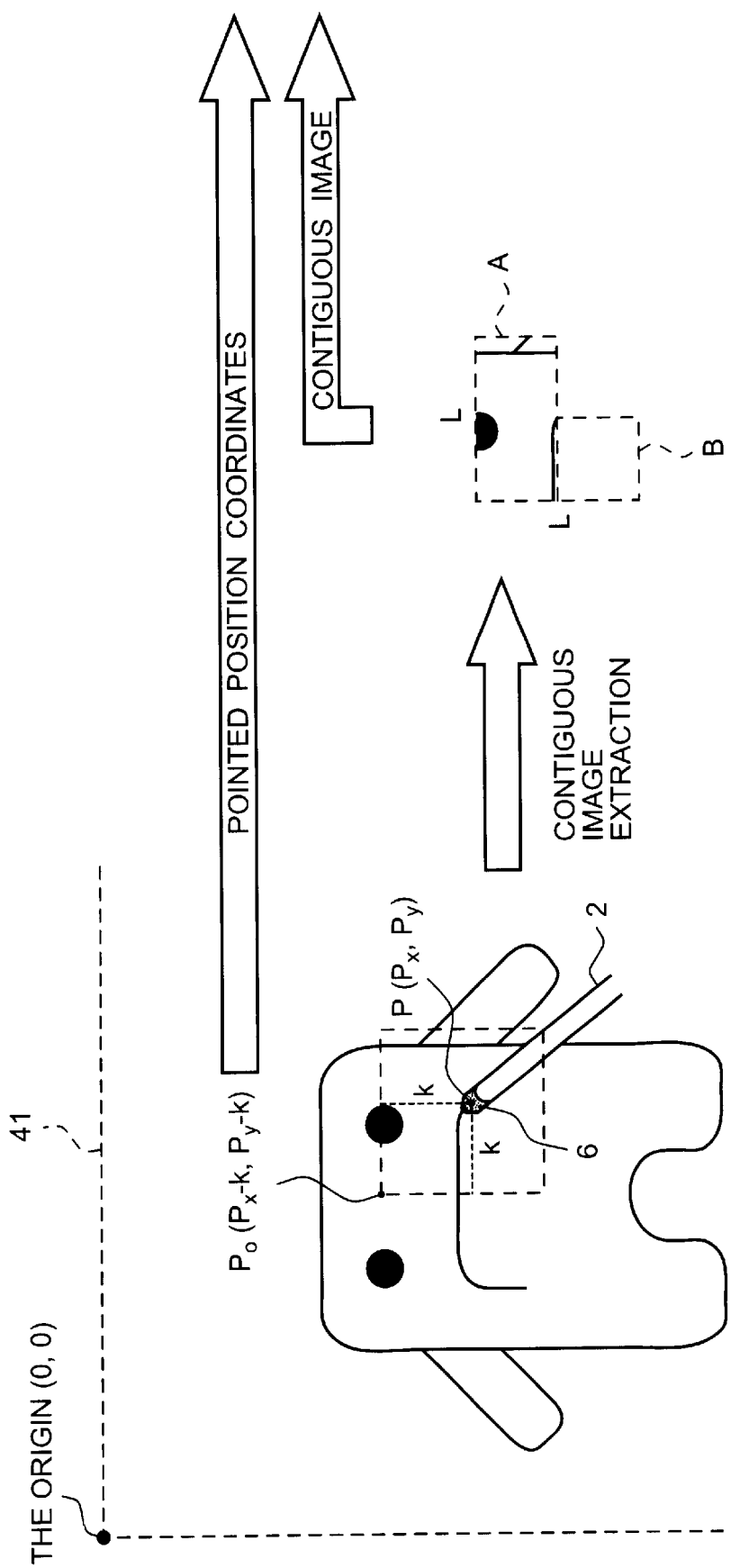

HANDWRITING COMMUNICATION SYSTEM AND HANDWRITING INPUT DEVICE USED THEREIN

BACKGROUND OF THE INVENTION (1) Field of the Invention

The present invention relates to a communication system for transmitting handwriting either mainly or supplementarily, using computers which are connected via a network, and to a handwriting input device and a handwriting display device used in such a handwriting communication system, and more specifically to an optimal system for the handwriting communication in a TV conference system, and for a telecommunicative coaching school which utilizes the Internet, and to a handwriting input device and a handwriting display device used in the system.

(2) Description of the Related Art

In recent years, since the Internet has become increasingly popular, a shift from a conventional coaching school to a new mode of a home study coaching school is groped. The conventional coaching school is one in which students come to the coaching school to study. The new mode of the home study coaching school is one in which students together with a teacher proceed to study through telecommunications on the Internet. For the home study coaching school, it is desired to actualize the handwriting communication system through which an answering sheet written by the student can be seen by the teacher in a real time base.

For this kind of home study coaching school system, a touch panel system or a handwriting input pad on which one can make a direct input on the liquid crystal display directly with a dedicated purpose pen can be used. However, since most of conventional answering means employ a sheet of paper, the way of study by the electronic pen and a liquid crystal display is too different from the normal way of study at school or at home, and thus the introduction of the electronic pen and the liquid crystal display is difficult for children to accept.

Another way of transmitting the answering sheet in which the image of a handwritten answering sheet is sent through a facsimile or TV conference system can be considered. However, since there is a large quantity of information in the whole answering sheet, the transmitting time of the information sometimes takes from a few seconds to a few minutes, so that it is difficult for a teacher to deal with the student on a real time base. Furthermore, although on the conventional TV conference system, it is possible to confirm the face of student, when a camera of the TV conference system takes a picture of the answering sheet, the resolution of the camera is not enough to confirm the letters written or filled out on the answering sheet, so that the TV conference system is not suitable for transmitting the answering sheet on a real time base.

There is a handwriting input device to input the information written on paper into a computer, called "Crosspad" by IBM Corporation. In this device, a ballpoint pen is equipped with a communicator to generate an electric wave. When handwriting is conducted on the paper placed on a pad by the ballpoint pen, a plurality of coils embedded in the pad detect the electric wave of the ballpoint pen to locate a position of the pen tip of the ballpoint pen. By tracing the detected position of the pen tip, the handwriting information is obtained as vector information simultaneously with handwriting on the paper, and then this information may be memorized in the Crosspad unit or transmitted to the computer.

In these kinds of handwriting input devices, however, since a special dedicated purpose pen is used, a regular writing instrument sold at a store cannot be used. In other words, the writing instrument usually used by each person, or the special shape pencil used to correct the gripping of a pencil cannot be used for these input devices. Furthermore, the devices do not have an eraser function to erase handwriting, so that the input could not be conducted in such a manner that a person usually writes and erases with a pencil and an eraser. With these restrictions, the conventional devices cannot easily be used by anyone from children to aged persons.

Further, in the case where these input devices are used for a handwriting communication system, since the communicated information becomes vector information only, a document that is already written or a designated section of a printed matter cannot be sent. Moreover, since the transmittable information is vector information only, the information transmitted does not represent the line thickness of the letter or the color thereof.

Therefore, a handwriting communication system which allows to electrically transmit in real time the handwritten information input by using a pencil or erased by using an eraser, has been desired.

SUMMARY OF THE INVENTION

An object of the present invention, therefore, is to overcome the problems existing in the prior art, and to provide a handwriting communication system, and a handwriting input device, as well as, a handwriting display device used therein, which can communicate through handwriting among a plurality of computers connected via a network. The object of the present invention is further to provide an inexpensive handwriting communication system, handwriting input device and handwriting display device which allow commercially available writing instruments to be used freely. The object of the present invention is still further to provide a system and a device which can transmit a document that is already filled out, or a designated portion or all of a printed matter. More particularly, the object of the present invention is to provide a system and a device which are suitable for a telecommunicative coaching school to study at home.

According to one aspect of the invention, there is provided a handwriting communication system, which transmits and receives a handwriting with the use of a plurality of computers connected via a network, and is comprised of a handwriting input device provided at a transmitting side computer in order to input the handwriting information into the transmitting side computer, and a handwriting display system which is provided at a receiving side computer in order to display the handwriting based on the handwriting information transmitted to the receiving side computer. The handwriting input device is comprised of a trace display means in which the information to be transmitted is written, an input means for writing/erasing or designating the handwriting in the trace display means, an image taking means to take from above the image of the trace display means, a position detecting means to detect the pointed position when the input means is placed on the trace display means, and an image processing means to extract a contiguous or adjoining image around the pointed position of the input means which is detected by the position detecting means from the whole image taken by the image taking means and to generate contiguous image information. The handwriting display device is comprised of an image reconstruction means to reconstruct the image based on the contiguous image information extracted by the image processing means and the position pointing information detected by the position detecting means, and the handwriting display means to store and display the reconstructed images on the display screen.

The present invention also relates to a handwriting input device comprised of an input means to enter a handwriting or to erase a handwriting, a trace display means to display the trace accompanied with the operation of the input means, an image taking means to take from above the whole image of the trace display means, a position detecting means to detect the position of the input means when it is placed on the trace display means, and an image processing means to extract a contiguous image of the pointed position of the input means detected by the position detecting means from the whole image taken by the image taking means.

The present invention further relates to a handwriting display device comprised of an image reconstructing means to reconstruct the image based on the contiguous image and the pointed position information, and a trace display means to store the reconstructed images and display them on a display screen. The image reconstructing means is equipped with a display memory corresponding to the display screen and generates an address from the pointed position information and data from the contiguous image information, and they are stored and displayed on the display screen by writing the data on the address in the display memory.

The position detecting means is comprised of a retroreflective material which is provided at the tip of the input means, and a light source which is provided near the image taking means to irradiate the input means, and detects the pointed position of the input means which is placed on the trace display means by detecting the position of the retroreflective material based on the differences in brightness of images taken by the image taking means.

The retroreflective material provided at the tip of the input device is either provided in at least two places with a space therebetween, or is provided in such a way that a narrow and long image is taken by the image taking means. The image processing means detects the direction or the orientation of the input means from the shape of the retroreflective material whose image is taken by the image taking means, and the image processing means removes the image of the input means from the extracted contiguous image based on the detected direction of the input means.

Otherwise, the shape of the retroreflective material is either predetermined by the kinds of the input means, or changed by the operation of the operator, and the image processing means changes the sizes of extracted contiguous images in accordance with the shapes, and processes them.

Further, color filters may be provided on the front of the reflective surface of the retroreflective material. Either the light source can be changed to emit a plurality of colors of light or the image taking means is capable of detecting color, and by distinguishing the plurality of retroreflective materials, the kinds of the plurality of input means are distinguished.

The image processing means also removes the fourth quadrant portion of the extracted contiguous image.

The image reconstruction means is equipped with a display memory corresponding to the display screen. It generates an address from the pointed position information and data from the contiguous image information, and stores and displays the trace on the trace display means on the display screen by writing the data on the address in the display memory.

The image taking means is either provided in the upper left corner or in the upper right corner of the trace display means for a right-handed operator or a left-handed operator respectively.

The image processing means can be provided within the transmitting side computer or receiving side computer.

A generally used TV conference system sacrifices resolution to reduce communication volume, so that when an image of the whole sheet is taken, details become difficult to identify. The present system according to the invention, however, transmits only a contiguous image around the handwritten portion, which reduces the communication volume compared to transmitting the whole image, which makes the real time transmission and reception of handwriting trace possible. Moreover, the reduction of data volume does not result from lowering resolution, so that it becomes possible to provide a handwriting communication system which can transmit detailed portions.

BRIEF DESCRIPTION OF THE DRAWINGS

The above and other objects, features and advantages of the present invention will be apparent from the following description of the preferred embodiments of the invention explained with reference to the accompanying drawings, in which:

FIG. 3 is a diagram showing a process in which the fourth quadrant portion is cut by a control section from a whole picture taken by the TV camera;

DESCRIPTION OF THE PREFERRED EMBODIMENT

Reference will now be made in detail to the preferred embodiments of the present invention, examples of which are illustrated in the accompanying drawings.

Figure 1:
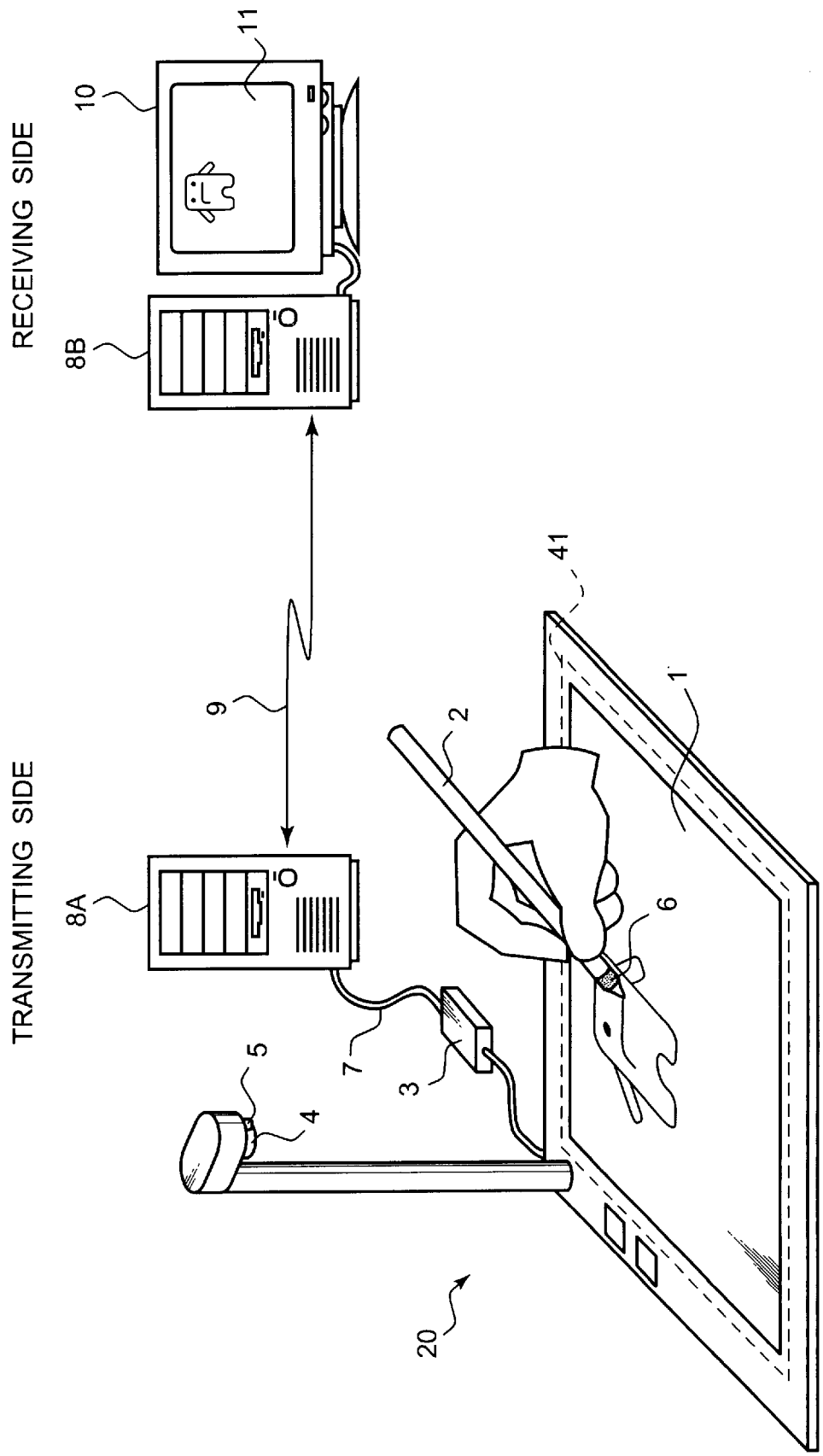
FIG. 1 is a diagram showing a minimum essential configuration of a handwriting communication system in accordance with the present invention.

FIG. 1 is a diagram showing a minimum essential configuration of the handwriting communication system in accordance with the present invention. Two computers, 8A and 8B, are connected therebetween by a network, for example, by the Internet network 9. In this example, one example of the system is to display in real time a handwriting input on a display screen 11 of a monitor 10 which is connected to the receiving side computer 8B using the handwriting input device which is connected to the transmitting side computer 8A.

Figure 2A:
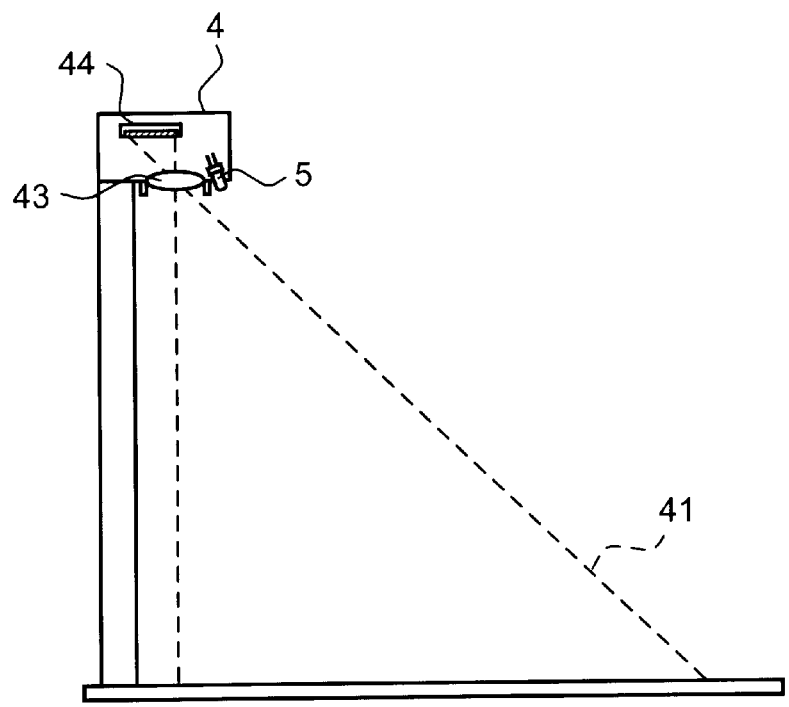
FIG. 2 is a side view and a top view of a handwriting input device in accordance with the present invention.
Figure 2B:
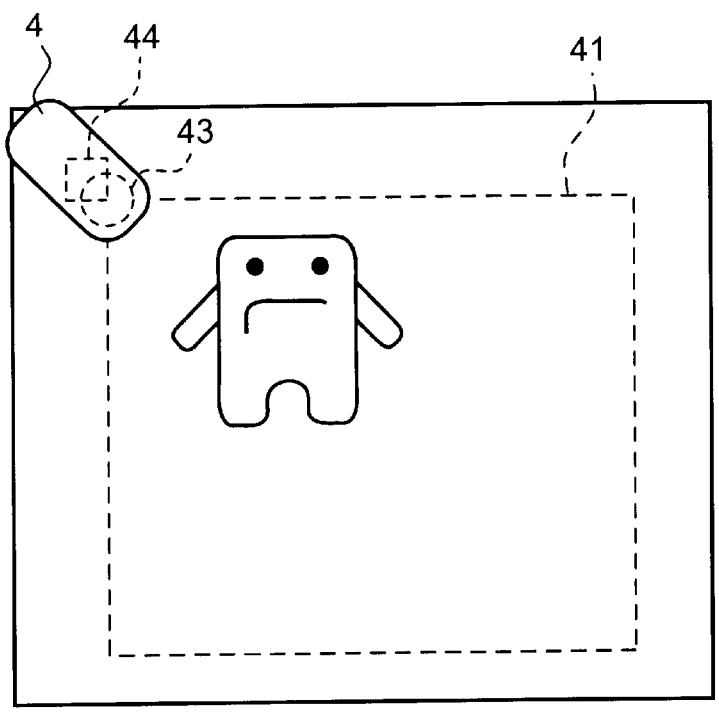

As shown in FIG. 1, a blank sheet of paper 1 is placed on a table of the handwriting input device 20 which is connected to the transmitting side computer 8A via such a connection cable 7 as USB or IEEE1394 cable, and the whole image of the sheet 1 is taken by a TV camera (CCD camera) 4. The TV camera 4 is arranged in such a way as to have the whole sheet contained in a view field 41 of the camera 4 from above the handwriting input device 20. FIG. 2 shows the positional relationship of the TV camera 4 and the main body of the handwriting input device. In the case where the operator is right-handed, the TV camera 4 is preferably placed at the upper left corner of the main body of the handwriting input device. By placing the camera in this position, in addition to the merit of not interfering with the work performed, it is possible to lower the occurrence rate of disturbances in taking the images such as letters when entered by a writing instrument or by a finger. Needless to say, in the case of a left-handed operator, the camera is preferably placed at the upper right corner. It is possible to move the position of the TV camera 4 to a desired place by adjusting to the operator's posture, or in accordance with the writing habit of the operator. As shown in FIG. 2A, the TV camera 4 takes the image of the sheet 1 from above at an oblique angle, so that the lens 43 and the image sensor 44 of the TV camera 4 are preferably installed in such a way that their center positions are off set. In the case where a commercially available TV camera is used, the TV camera may be placed in a position where the whole image of the sheet 1 is contained in the fourth quadrant portion of the image taken by the camera.

FIG. 1 shows only directly related portions extracted from the whole system in order to make it easy to describe the main points of the present invention. In the actual system, it is possible to connect a monitor to the computer 8A, connect a handwriting input device to the computer 8B, connect microphones and speakers to each computer, as well as TV cameras, to show the faces of operators to make the system to be an interactive TV conference system. In this kind of an interactive TV conference system with a handwriting communication function, on a screen of each of the monitors, one's own face, the face of the other side operator, the image of the own handwriting on the sheet, the image of the other side's handwriting on the sheet, data display windows, and the like are preferably shown. The explanation will now be made on the minimum essential configuration of the present invention hereinafter.

A tape 6, which is made of a retroreflective material, is wrapped around a writing instrument 2 such as a pencil, a pen, an eraser, or ink eradicator beforehand. When a handwriting operation is conducted by using the writing instrument on which this retroreflective tape 6 is wrapped, the retroreflective tape returns the light emitted from the LED 5 which is provided in the TV camera 4 to the direction of the light source, so that this tape portion looks brighter than the other portions in the whole image taken by the TV camera 4. This bright portion is judged as the input position of the writing instrument 2, and the following process will be conducted.

A control section 3 extracts the pointed position coordinate of the writing instrument 2 and a contiguous or adjoining image of the pointed position from the whole image taken by the TV camera 4. This information is transmitted to the receiving side computer 8B, and the computer 8B displays the handwriting image drawn on the sheet 1 in real time on the display screen 11 of the monitor 10 based on the transmitted information of both the position coordinates and the contiguous image. More specifically, the control section 3 judges the brightest section in the whole image as the input pointed position of the writing instrument 2, extracts the contiguous image of the spot with a predetermined side length "L", and transmits this information to the computer 8B. The computer 8B is equipped with a display memory corresponding to the display screen 11, and it generates an address from the transmitted position coordinate information, and data from the contiguous image information and, by writing the data in the address, the information is stored and displayed on the display screen 11. In this manner, the handwriting image drawn on the transmitting side sheet 1 is displayed in real time on the display screen 11 of the monitor 10 which is connected to the receiving side computer 8B. Instead of sending a whole image, which has a large volume of data, a contiguous image, which has a small data volume, is transmitted, so that even when the image is transmitted through an analogue modem, or the like, which has a slow transmitting speed, a good response can be obtained.

One potential problem is that the image of the tip of the writing instrument may appear in the contiguous image of the writing instrument, and occasionally the trace of the writing instrument's tip is stored and displayed. In order to avoid this problem, as an example, if the operator is right-handed, the writing instrument is assumed as located in the fourth quadrant of the contiguous image as shown in FIG. 3A, after extracting the contiguous image around the tip of the pen 2 by conducting the process shown in FIG. 4, an image data is transmitted which has removed the fourth quadrant portion from the contiguous image as shown in FIG. 3B to the receiving side computer together with the pointed position coordinate.

Figure 4:
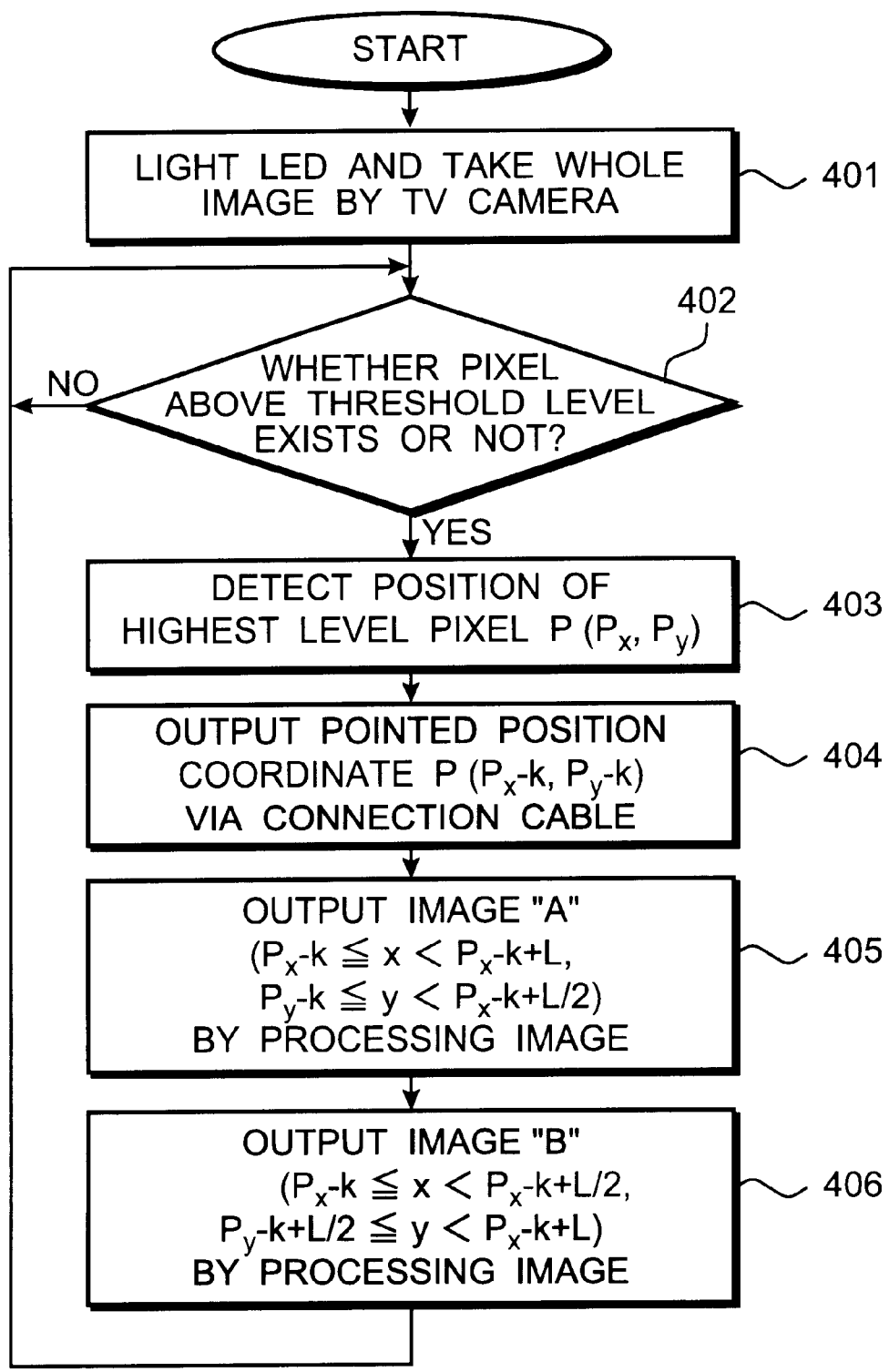
FIG. 4 is a process flow chart of the control section.

The cut operation of the fourth quadrant portion at the control section 3 will be explained with reference to the flowchart in FIG. 4. First, in Step 401, the power source of the handwriting input device is turned on, the LED 5 is turned on, and the TV camera 4 takes the whole image of the sheet 1. Next, in Step 402, whether the retroreflective tape 6 which is attached to the pen tip exists or not in the whole image is determined. In other words, the existence or non-existence of pixels which have a higher value than a predetermined threshold level, is to be detected. If the highest value pixel is detected, the position of the pixel is determined as P (Px, Py) (Step 403). Based on this position coordinate P (Px, Py), the contiguous image coordinate Po (Px−k, Py−k) is determined, and the contiguous image is output by the computer 8A via a connection cable such as the USB cable (Step 404). Simultaneously, by Steps 405 and 406, an image from which the fourth quadrant portion from the contiguous image having a side length "L" is removed is output to the computer. More specifically, from the contiguous image coordinates Po in Step 404, an image A (Px−k≦x<Px−k+L, Py−k≦y<Py−k+L/2) (the images of the first and second quadrant portions), and an image B (Px−k≦x<Px−k+L/2, Py−k+L/2≦y<Py−k+L) (the image of the third quadrant portion) are image-compressed or binarized, and output to the computer 5A via the connection cable 7 (Steps 405, 406). This extraction process of the contiguous image at the control section 3 also may be conducted within the transmitting side computer 8A. In this manner, the extracted contiguous image information and the pointed position coordinate information of the contiguous image are transmitted to the receiving side computer 8B from the transmitting side computer 8A via Internet network 9. An image compression process or an image binarization process is conducted to reduce the data volume of the extracted image for the transmission. This makes it possible to eliminate redundancy of the data.

The position of the actual pointed position of the pen 2 and the position of the retroreflective material 6 are desirably offset by setting L/2<k. By doing so, it becomes possible for the pen tip image of the pen 2 not to be completely taken within the image A or image B.

Figure 5:
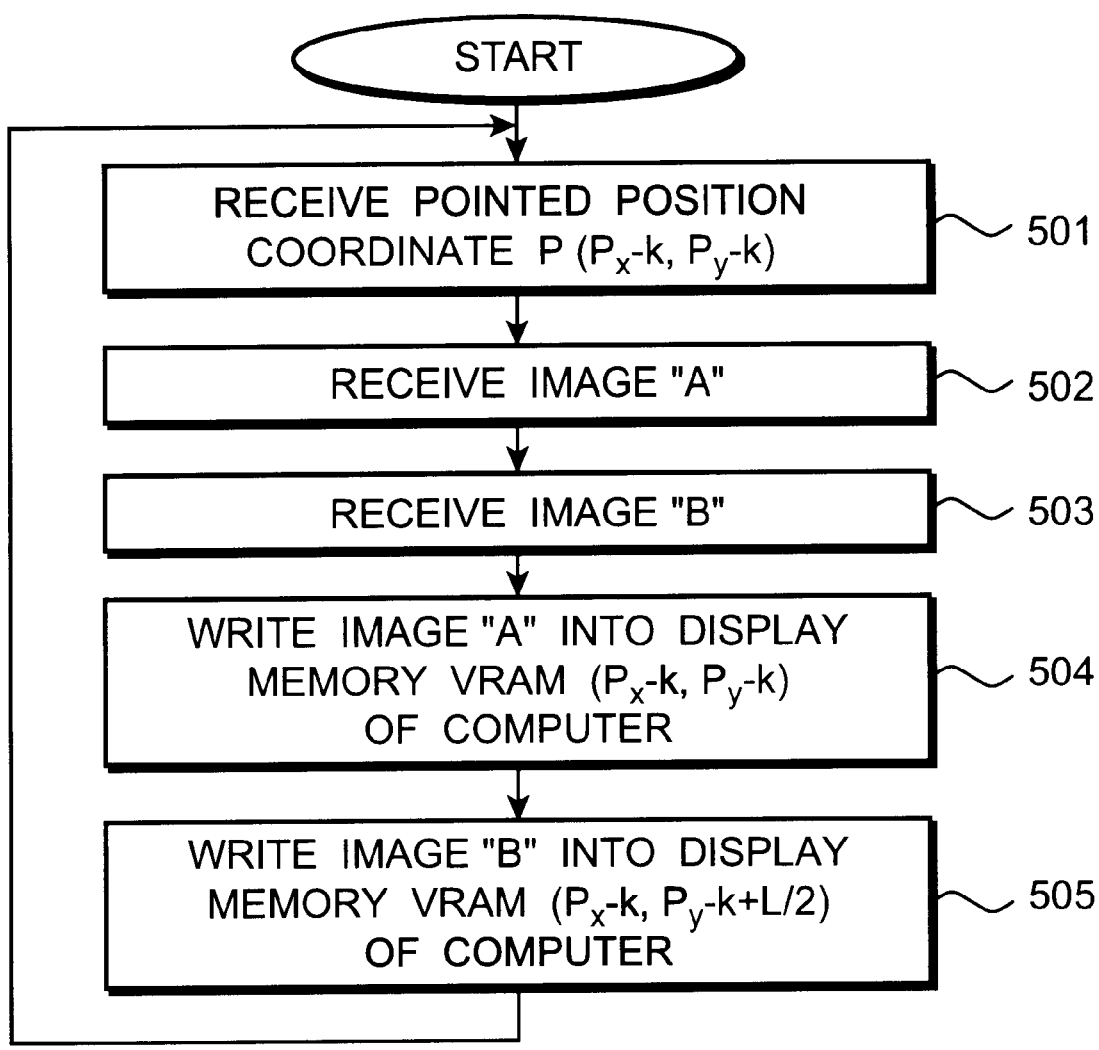
FIG. 5 is a process flow chart of the receiving side computer.

In the receiving side computer 8B, by conducting a process as shown in FIG. 5, the image of the handwriting drawn on the sheet 1 is displayed on the display screen in real time. At first in Steps 501, 502 and 503, the contiguous image coordinate Po (Px−k, Py−k), the image A, and the image B, which are transmitted from the transmitting side computer 8A via the Internet network 9, are received respectively by the receiving side computer 8B. Then, in Steps 504 and 505, based on the received coordinate position information, each of the images A and B is written into the corresponding address of the VRAM, and the handwriting image is stored and displayed on the display screen 11.

It is acceptable to extract the contiguous image data (Px−k≦x<Px−k+L, Py−k≦y<Py−k+L) from the whole image by the control section 3, instead of transmitting the data separately as the image data A and the image data B, and apply a process to remove the fourth quadrant portion (Px−k+L/2≦x<Px−k+L, Py−k+L/2≦y<Py−k+L) In this case, it is possible to conduct the process to remove the fourth quadrant portion in the receiving side computer 8B instead of in the control section 3 or in the transmitting side computer 8A.

In the above embodiment, the fourth quadrant portion of the contiguous image has been removed for the right-handed operator. In the case where a left-handed operator uses the device, it is a matter of course to change the system to remove the third quadrant portion. In this case, it is possible to construct the system to conduct a control based on the positions of the TV camera 4 such that, if the TV camera 4 is located at the upper left corner, the fourth quadrant portion is removed for a right-handed operator, and if the TV camera 4 is switched and moved to the upper right corner, the third quadrant portion is removed for a left-handed operator.

Also, in the above embodiment, the input position coordinate of the writing instrument is optically detected by using a light source and a retroreflective material. However, it is also possible to detect the input position coordinate by using a tablet of an electromagnetic induction system or a pressure sensitive resistance membrane system or the like, instead of using the light source and the retroreflective material.

In the above embodiment, the writing instrument is assumed to exist in the fourth quadrant, regardless of the direction of the pen or the thickness of the pen, and thus the fourth quadrant is removed. In the embodiments explained below shown in FIGS. 6 and 8, the direction of the pen 2, i.e., the direction of the image of the writing instrument 2 in the contiguous image which is extracted is detected. By cutting only the image of the writing instrument 2 in accordance with the detected direction, the image of the writing instrument 2, regardless of its direction, can be removed.

Figure 6A:
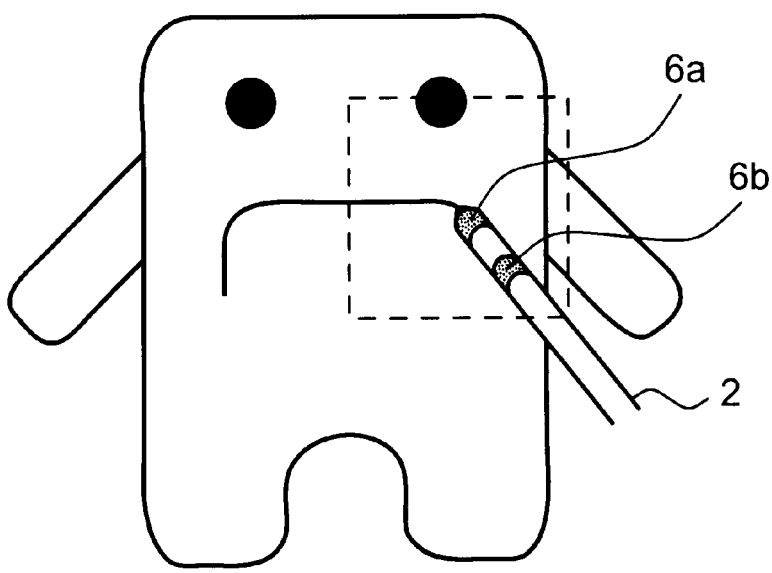
FIG. 6 is a diagram illustrating an example of retroreflective materials, which are placed on the tip of a writing instrument with a space therebetween.
Figure 6B:
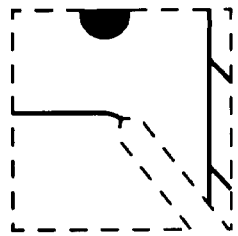

In FIG. 6A, the retroreflective materials 6a and 6b are placed with a space between the two locations of the tip of the pen 2. In this way, the direction of the pen 2, i.e., the direction of the image of the pen 2 in the contiguous image can be detected, so that the image of the writing instrument, which is to be cut, can be minimized. In the control section 3, the image of the tip portion of the pen 2 is cut from the contiguous image based on the direction of the image of the pen 2. The contiguous image output from this control section 3 is one as shown in FIG. 6B. As seen from this figure, the image of the pen 2 is not included in the contiguous image which is to be transmitted, so that there is no problem that a residual image of the pen appears on the display screen 11 of the receiving side computer 8B.

As shown in FIG. 6A, where the retroreflective material placed on the tip of the pen 2 is constituted by a wide retroreflective tape, this portion is taken by the TV camera 4 as a long and narrow image, thereby making it possible to detect the direction of the pen 2 in the same way as described above. Therefore, the image of the tip portion of the pen 2 can easily be cut easily from the contiguous image.

Figure 6C:
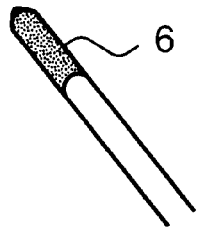
Figure 7A:
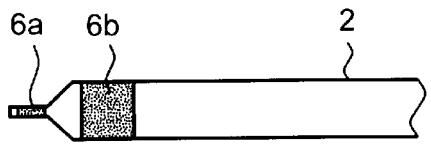
FIG. 7 is a diagram showing various examples of how the retroreflective materials can be placed on the tip of a writing instrument.

In the above-described embodiment in FIG. 6, although the direction of the pen 2 can be detected, there is a case where the exact quadrant of the placed pen 2 cannot be detected. In other words, the pen tip is assumed to be either at a lower left or at an upper left for a right-handed operator, and a cutting process for the image of the pen is conducted, so that in the case where a left-handed operator makes a pen input, the pen tip may be recognized wrongly. One way to solve this problem is to set to the device whether the operator is a right-handed or a left-handed in advance. Another way of solving the problem is to make the retroreflective materials provided on two places different shapes respectively. In FIG. 7, various examples of retroreflective material 6 which is to be placed at the tip of the writing instrument 2 are shown. FIG. 7A is an example of placing the retroreflective material 6a at the pen tip of a mechanical pencil, and 6b at the tip of the grip portion, respectively. Thus, by placing the retroreflective materials, the direction in which the pen tip is oriented can be detected completely, including the detection where the quadrant of the pen exists. Consequently, regardless of the manner in which an operator holds the pen 2 and uses it, or whether the operator may be right-handed or a left-handed, only the image of the pen can be cut accurately.

Figure 7B:
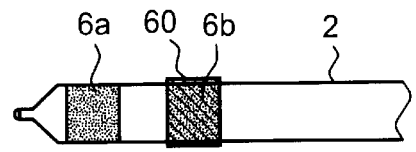
Figure 7C:
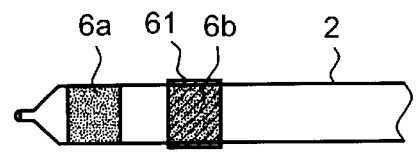

Moreover, by covering one of the retroreflective materials, which are placed with a certain space between them, as shown in FIGS. 7B and 7C with a color film, e.g., blue film 60 or red film 61 and the like, it is possible to detect where the quadrant of the pen exists from the color taken by the TV camera. Needless to say, it is also possible to attach the retroreflective material only at the tip of the writing instrument, and determine the thickness, direction and the like of the writing instrument by the image recognition technology.

Figure 8A:
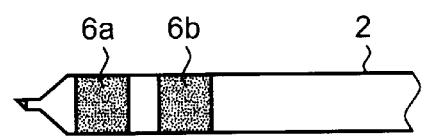
FIG. 8 is a diagram showing various examples of changing retroreflective materials provided at the tip of a writing instrument in accordance with the kinds of writing instruments.
Figure 8B:
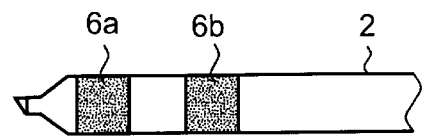
Figure 8C:
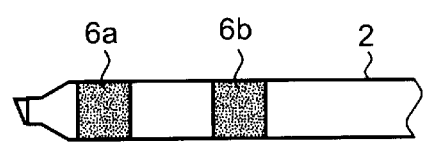
Figure 8D:
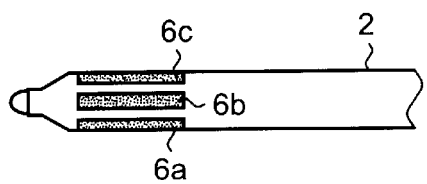
Figure 8E:
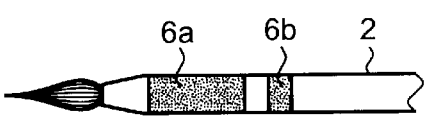

Moreover, by changing the retroreflective materials, which are to be placed at the tips of the writing instrument, in accordance with kinds of the writing instruments, it is also possible to change the size of the extracting contiguous images based on the shapes of the retroreflective materials. In FIG. 8, examples of the retroreflective materials, which are to be attached to the various writing instruments, are shown. For example, a change in the distance between 6a and 6b of the retroreflective materials, which are to be attached in two places, in accordance with the thickness of the line drawn by each pen. The thickness of the pen is memorized in advance by the handwriting input device, e.g. a pen with the shortest distance of the two retroreflective materials is a fine pen, (FIG. 8A), one with the longest distance is a thick line pen (FIG. 8C), one with a medium distance is a medium pen (FIG. 8B). Then based on the distance between the two retroreflective materials 6a and 6b, the size "L" for the contiguous image which is to be extracted may be determined. Namely, for the fine pen, the size of the contiguous image is made small, and for the thick pen, the size of the contiguous image is made large. It is also possible to judge the writing instrument by placing retroreflective materials 6a, 6b and 6c in the longitudinal direction with a certain space as shown in FIG. 8D, or by changing the width between two retroreflective materials 6a and 6b, which are placed at two locations as shown in FIG. 8E. Especially, in the cases of an ink eraser or a brush as shown in FIGS. 8D and 8E, since the input becomes a wider range as compared with the input by a pen, the contiguous image is desirably extracted with wider range, and by distinguishing the kinds of the writing instrument, contiguous images can be attained with desired sizes so that no portion of the handwriting will be missed.

Figure 8F:
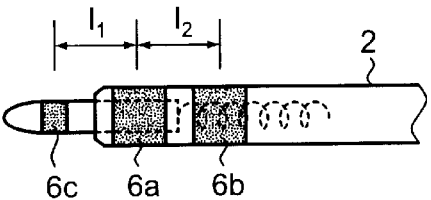

In the case of an instruction stick as shown in FIG. 8F, in which the tip portion varies in accordance with the pressing pressure, by placing the retroreflective materials as shown in the figure, it is possible to determine the size "L" of the extracting contiguous image from the value of the distance $l_1$ between the retroreflective materials 6a and 6b, to the value of the distance 12 between the retroreflective materials 6a and 6b. Since this instruction stick is used, the portion transmitted is traced by the instruction stick on the sheet which is already filled out, and by changing the pressing pressure of the stick, the size of the contiguous image is changed, so that the letter strings of large or small size is transmitted to the other side efficiently. In other words, the greater pressing pressure is applied (the smaller the value of $l_1/l_2$ is), the larger the size L of the contiguous image is set. This kind of tool is useful for a presentation in which only a small and necessary portion is displayed at first, and the area of the display is gradually expanded, instead of displaying the whole image from the beginning.

At the receiving side computer, then, by storing and displaying the transmitted contiguous image data based on the coordinate data simultaneously transmitted, the handwriting image being drawn on the handwriting input device connected to the transmitting side computer is displayed on the display screen of the monitor which is connected to the receiving side computer in real time. If the process for removing the image of the writing instrument from the contiguous image is conducted at the receiving side computer, it is possible to display a writing instrument or an instruction stick on the display screen to be just like a mouse pointer by first displaying the contiguous image including the image of the writing instrument without storing images prior to the cutting process. Then the contiguous images transmitted thereafter can be stored and displayed, and thus the writing instrument may be removed. In this manner, it becomes easier for the receiving side to grasp the input operation, and the position pointed by an instruction stick can be easily known. When the removing process of the writing instrument is conducted at the transmitting side computer, the same result as described above can be obtained by sending the contiguous image before removing the writing instrument, and the contiguous image after removing the writing instrument. It is also possible to send only the contiguous images after the instrument is removed from the transmitting side computer, and then, at the receiving side computer, such a pointer as an arrow may be added to show where the image of the writing instrument was removed.

Figure 9:
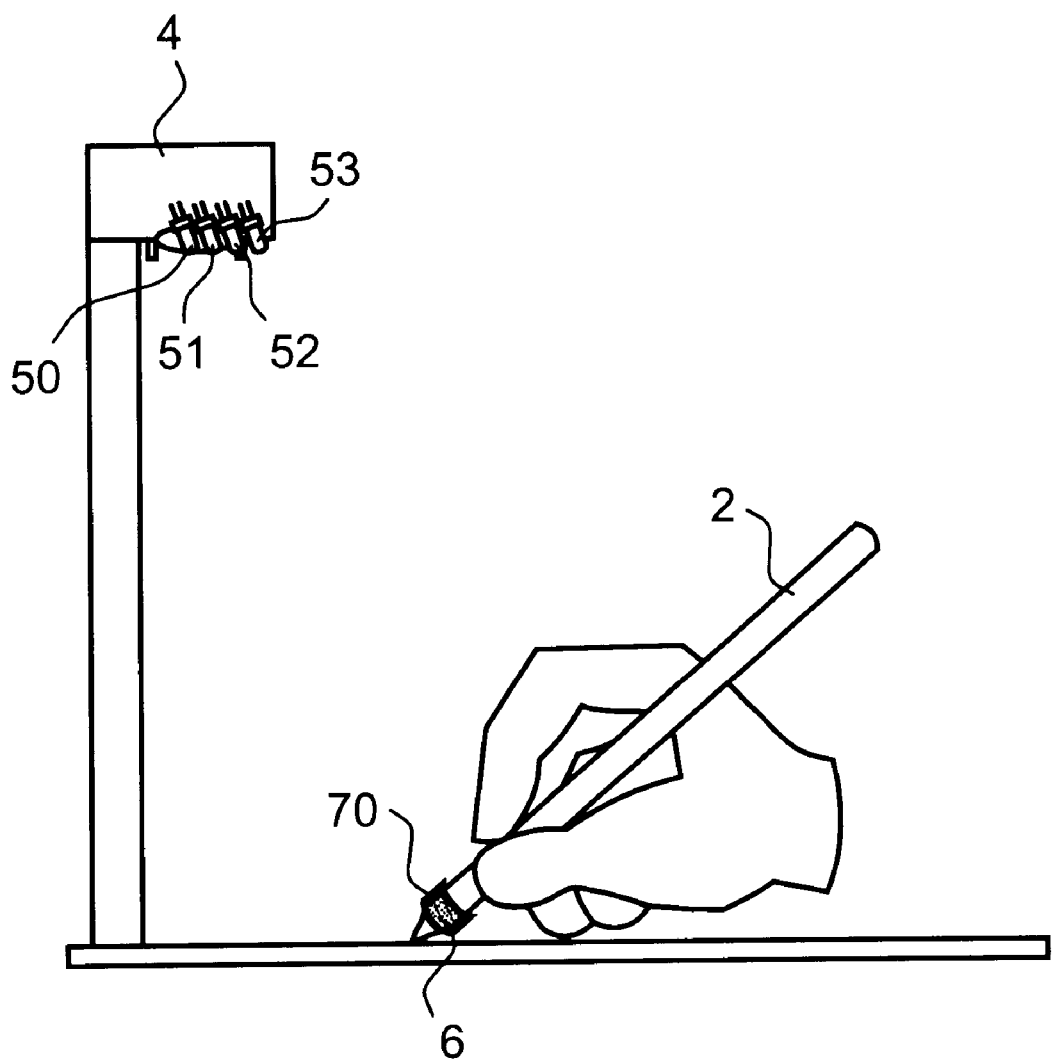
FIG. 9 is a diagram showing an example of a configuration of a light source to detect color information in the case of a mono-color TV camera.

In the case where the TV camera is a color TV camera, by sending the contiguous image to the receiving side computer without binarizing the image, but with applying only the compression process of the image, then at the receiving side computer, a blue colored handwriting, for example, is displayed as a blue handwriting line, and the red colored handwriting is displayed as a red colored line. However in the case where a black and white TV camera is used, by configuring a light source with colored filters as shown in FIG. 9, it becomes possible to transmit the color information.

More specifically, for example, the light source is configured with a red colored LED 50, a yellow colored LED 51, a green colored LED 52, and an infrared LED 53, and the LEDs are allowed to irradiate sequentially. Also, the retroreflective material 6 which is attached to the writing instrument 2 is covered by a colored filter 70. For example, for a red colored pen, the retroreflective material is covered with a colored filter which causes only the red color light to pass through, for a yellow pen, a colored filter which causes only the yellow light to pass through, for a green pen, a colored filter which causes only the green light to pass through, and for a brush, an infrared filter is provided. In this way, for example, if only the red colored LED is lit, a bright portion is detected, and it is judged that the pen is a red color pen, and the color information, in which the image is conducted by the red colored pen, together with the contiguous image, and coordinate data are transmitted. At the receiving side, then, the handwriting line with red color is displayed based on this color information. Likewise, when the information is received that the input is made by a yellow pen, then the yellow line is displayed. By configuring the device in this manner, the color information can be transmitted from the transmitting side to the receiving side without using an expensive color TV camera.

There is a problem that an image of the handwriting line cannot be taken if it enters into the shadow of the writing instrument seen from the TV camera when the writing instrument is moved in the opposite direction from the direction of the writing instrument taken by the TV camera, i.e., when the writing instrument is moved towards the TV camera. This problem, however, can be overcome by sending information separately to the other side when the handwriting line becomes available again for an image to be taken, and this processing function may also be provided in the control section 3 or the image processing section of the computer 8A. Moreover, by providing a monitor at the transmitting side to allow the operator to see the transmitted image, the operator traces the portion where the handwriting line is not transmitted with the writing instrument, so that it is possible to restore the transmitted image.

It is to be understood that the handwriting communication system, the handwriting input device and the handwriting display device thereof which are used in the system in accordance with the present invention are not limited to the embodiments and modifications described above, and that various changes and modifications may be made without departing from the spirit and scope of the invention. For example, all the processing conduced in the control section may be conducted in the transmitting side computer, and in lieu of the Internet network, any system which allows transmission and reception of data, such as a LAN, a cable, a wireless communication, an optical communication and the like, may be used. Moreover, a system may be configured to have processing conducted in the transmitting side computer and processing conducted in the receiving side computer. This is to be executed in two different processes within one single computer (programs which are executed simultaneously in their appearance), and these two processes can communicate with each other via inter-process communication means. Also, the kinds of the writing instrument used can be recognized by using polarizing filters instead of color filters.

As has been explained hereinabove, in accordance with present invention, the handwriting information of drawing and erasing with a writing instrument may be transmitted in real time. Further, according to the invention, since the transmitted data is the contiguous image data and the pointed position coordinate information of the pointed position of a writing instrument, the volume of the transmitted data can be reduced to be very small.

By attaching the retroreflective material on a writing instrument, a high reflection efficiency can be obtained, which allows to distinguish easily the images of the retroreflective materials from the images taken by the TV camera, so that it is easy to detect the pointed position of the writing instrument. Also since the image processing can be made simple, the high economical efficiency can be obtained.

The present invention further makes it easy to detect the pointed position of the writing instrument or the direction thereof by attaching the retroreflective materials at two locations. The present invention is also capable of transmitting the optimal information for the writing instrument by providing different shapes of the retroreflective materials in accordance with the various kinds of writing instruments, or making the retroreflective materials variable by operation, and by changing the sizes of the contiguous images to be transmitted in accordance with these shapes. In this manner, the transmission of the redundant information may be reduced, and the operator can provide accurate instruction for the portion that the operator wants to send to the other side.

Thus, according to the present invention, a communication conference system in which anyone, from a child to an aged person, can use easily can be realized. Since the transmission speed for this communication conference system can be lowered, such low transmission speed equipment as an analog modem can be used, so that an economically efficient communication conference system can be provided.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A handwriting communication system for transmitting and receiving a handwriting by using a plurality of computers, which are connected via a network, said system comprising:
    a handwriting input device provided at a transmitting side for inputting a handwriting into a transmitting side computer; and
    a handwriting display device provided at a receiving side for displaying said handwriting based on information transmitted from said transmitting side computer to a receiving side computer via said network;
    said handwriting input device comprising:
        a trace display means for trace information to be written in;
        an input means to write said handwriting, to erase said handwriting, or to point out said handwriting on said trace display means;
        an image taking means to take a whole image of said trace display means from above;
        a position detecting means to detect a pointed position when said input means is placed on said trace display means; and
        an image processing means to extract a contiguous image of said pointed position of said input means detected by said position detecting means from said whole image taken by said image taking means;
    said handwriting display device comprising:
        an image reconstruction means to reconstruct an image based on said contiguous image information extracted by said image processing means, and said pointed position detected by said position detecting means; and
        a handwriting display means to store and display the reconstructed image on a display screen,
        said position detecting means comprising a retroreflective material which is provided at a tip of said input means, and a light source which is provided adjacent to said image taking means for irradiating said input means; said position detecting means detecting said pointed position of said input means which is placed on said trace display means by detecting a position of said retroreflective material based on a difference in brightness in said whole image taken by said image taking means.

2. The handwriting communication system as claimed in claim 1, wherein said retroreflective material provided at said tip of said input means, is placed at least at two locations with a space therebetween, said image processing means detecting a direction of said input means from a shape of said retroreflective material taken by said image taking means, and removing an image of said input means from the extracted contiguous image based on said direction of the detected input means.

3. The handwriting communication system as claimed in claim 1, wherein said retroreflective material provided at said tip of said input means, is placed in such a manner as to be reflected to said image taking means as a narrow and long image, said image processing means detecting a direction of said input means from a shape of said retroreflective material taken by said image taking means, and removing an image of said input means from the extracted contiguous image based on said direction of the detected input means.

4. The handwriting communication system as claimed in claim 1, wherein said retroreflective material has one of a shape which is determined in accordance with a kind of said input means, and a shape which is changed in accordance with an operation of an operator, and said image processing means changes sizes of said contiguous image extracted in accordance with said shape.

5. The handwriting communication system as claimed in claim 1, wherein said retroreflective material is equipped with a colored filter in front thereof, said light source emits by switching a plurality of colors of light, and said image processing means recognizes kinds of said input means by detecting reflected light from said retroreflective material.

6. The handwriting communication system as claimed in claim 1, wherein said retroreflective material is equipped with a colored filter in front thereof, said image taking means detects a plurality of colors of light, and said image processing means recognizes kinds of said input means by detecting reflected light from said retroreflective material.

7. The handwriting communication system as claimed in claim 1, wherein said image processing means removes a fourth quadrant portion of said extracted contiguous image.

8. The handwriting communication system as claimed in claim 1, wherein said receiving side computer removes a fourth quadrant portion of said extracted contiguous image.

9. The handwriting communication system as claimed in claim 1, wherein said image reconstruction means has a display memory corresponding to said display screen, and generates an address from said pointed position and data from said contiguous image, thereby storing and displaying on said display screen said trace information on said trace display means by writing said data into said address of said display memory.

10. The handwriting communication system as claimed in claim 1, wherein said image taking means is positioned above an upper left corner of said trace display means for a right-handed operator, or an upper right corner of said trace display means for a left-handed operator.

11. The handwriting communication system as claimed in claim 1, wherein said image processing means is provided in said transmitting side computer.

12. A handwriting input device for transmitting a handwriting by using a computer which is connected via a network, said handwriting input device comprising:

a trace display means for trace information to be written in;

an input means to write, to erase a handwriting, or to point out a handwriting on said trace display means;

an image taking means to take from above a whole image of said trace display means;

a position detecting means to detect a pointed position when said input means is placed on said trace display means;

an image processing means to extract a contiguous image of said pointed position of said input means detected by said position detecting means from said whole image taken by said image taking means, said position detecting means comprising a retroreflective material which is provided at a tip of said input means, and a light source which is provided adjacent to said image taking means for irradiating said input means; said position detecting means detecting said pointed position of said input means which is placed on said trace display means by detecting a position of said retroreflective material based on a difference in brightness in said whole image taken by said image taking means.

13. The handwriting input device as claimed in claim 12, wherein said retroreflective material provided at said tip of said input means is placed at least at two locations with a space therebetween, said image processing means detecting a direction of said input device from a shape of said retroreflective material taken by said image taking means, and one of said image processing means, the transmitting side computer and the receiving side computer removing an image of said input means from the extracted contiguous image based on said direction of the detected input means.

14. The handwriting input device as claimed in claim 12, wherein said retroreflective material provided at said tip of said input means is placed in such a manner as to be taken by said image taking means as a narrow and long image, said image processing means detecting a direction of said input device from a shape of said retroreflective material taken by said image taking means, and one of said image processing means, the transmitting side computer and the receiving side computer removing an image of said input means from the extracted contiguous image based on said direction of the detected input means.

15. The handwriting input device as claimed in claim 12, wherein said retroreflective material has one of a shape which is determined in accordance with a kind of said input means, and a shape which is changed in accordance with an operation of an operator, and said image processing means changes sizes of said contiguous image to be extracted in accordance with said shape.

16. The handwriting input device as claimed in claim 12, wherein said retroreflective material is equipped with a colored filter in front thereof, said light source emits by switching a plurality of colors of light, and said image processing means recognizes kinds of said input means by detecting reflecting light from said retroreflective material.

17. The handwriting input device as claimed in claim 12, wherein said retroreflective material is equipped with a colored filter in front thereof, said image taking means detects a plurality of colors of light, and said image processing means recognizes kinds of said input means by detecting reflecting light from said retroreflective material.

18. The handwriting input device as claimed in claim 12, wherein said image processing means removes a fourth quadrant portion of said extracted contiguous image.

19. The handwriting input device as claimed in claim 12, wherein said receiving side computer removes a fourth quadrant portion of said extracted contiguous image.

20. The handwriting input device as claimed in claim 12, wherein said image taking means is positioned above an upper left corner of said trace display means for a right-handed operator, or an upper right corner of said trace display means for a left-handed operator.

21. The handwriting input device as claimed in claim 12, wherein said image processing means is provided in said transmitting side computer.

\* \* \* \* \*